US008707737B2

(12) United States Patent
Chalk et al.

(10) Patent No.: US 8,707,737 B2
(45) Date of Patent: Apr. 29, 2014

(54) METHOD AND APPARATUS FOR PRESSURE CONTROL OF GLASS-MAKING THICKNESS-CONTROL ZONE

(75) Inventors: Paul Gregory Chalk, Danville, KY (US); Ahdi El Kahlout, Lexington, KY (US); Shawn Rachelle Markham, Harrodsburg, KY (US)

(73) Assignee: Corning Incorporated, Corning, NY (US)

( * ) Notice: Subject to any disclaimer, the term of this patent is extended or adjusted under 35 U.S.C. 154(b) by 288 days.

(21) Appl. No.: 12/627,212

(22) Filed: Nov. 30, 2009

(65) Prior Publication Data

US 2011/0126591 A1    Jun. 2, 2011

(51) Int. Cl.
*C03B 17/06* (2006.01)

(52) U.S. Cl.
USPC ........................................ 65/94; 65/92; 65/93

(58) Field of Classification Search
USPC ................................................. 65/90, 92–94
See application file for complete search history.

(56) References Cited

U.S. PATENT DOCUMENTS

| 3,607,183 | A | 9/1971 | Flori | 65/83 |
| 3,682,609 | A | 8/1972 | Dockerty | 65/83 |
| 3,723,082 | A | 3/1973 | Knowles et al. | 65/84 |
| 6,990,834 | B2 * | 1/2006 | Pitbladdo | 65/29.21 |
| 7,155,935 | B2 * | 1/2007 | Pitbladdo | 65/53 |
| 2007/0068197 | A1 * | 3/2007 | Pitbladdo | 65/90 |
| 2010/0122556 | A1 * | 5/2010 | Kin et al. | 65/90 |
| 2010/0162763 | A1 * | 7/2010 | Pitbladdo | 65/90 |
| 2010/0269542 | A1 * | 10/2010 | Nishiura et al. | 65/95 |
| 2011/0277504 | A1 * | 11/2011 | Pitbladdo | 65/53 |

FOREIGN PATENT DOCUMENTS

| CN | 202072600 U | 12/2011 | |
| GB | 1354006 | 6/1974 | C03B 15/02 |
| JP | 02-149438 | 6/1990 | C03B 17/06 |
| WO | 2008/132939 | 11/2008 | |
| WO | 2009/081740 | 7/2009 | |
| WO | 2009/081741 | 7/2009 | |
| WO | WO 2009081740 A1 * | 7/2009 | C03B 17/06 |
| WO | 2013/046683 | 4/2013 | |

OTHER PUBLICATIONS

State Intellectual Property Office of the People's Republic of China; Notice on the First Office Action; Date of Dispatch: Mar. 4, 2013.

* cited by examiner

*Primary Examiner* — Jodi C Franklin
(74) *Attorney, Agent, or Firm* — Jeffrey A. Schmidt

(57) ABSTRACT

Managing pressure within a thickness-control-zone (muffle door) housing (20) relative to pressures in a glass-making machine enclosure (60) and an upper chamber (40)—that is disposed outside the enclosure—so as to minimize or control undesired airflows that would adversely affect thickness (9) of glass ribbon (8). According to one pressure-management technique, the pressure at a location (25) in the housing (20) is managed so as to be less than the pressure at a location (65) that is within the enclosure (60) as well as both outside and adjacent to the housing. In the event of a leak, as by a crack or unintended opening in the housing, for example, this pressure difference reduces or prevents airflow toward the ribbon and, thereby, undesired thickness variation in the ribbon. According to a second pressure-management technique, the pressure at location (25) is managed so as to be greater than the pressure in the upper chamber.

10 Claims, 3 Drawing Sheets

METHOD AND APPARATUS FOR PRESSURE CONTROL OF GLASS-MAKING THICKNESS-CONTROL ZONE

BACKGROUND

1. Field

The present disclosure generally relates to controlling thickness, and more particularly thickness variation, in a glass ribbon as the ribbon is produced, wherein sheets are subsequently separated from the ribbon.

2. Technical Background

A muffle door is used to control thickness gradients in a glass ribbon, from which there are separated glass sheets for making displays—for example, LCDs, plasma displays, OLEDs, and/or electroluminescent displays—and is generally described in U.S. Pat. No. 3,682,609. Air is blown through a bank of tubes of specific diameter a specific distance from a front plate designed of high thermal conductivity material that faces glass that is at a temperature above its softening point temperature. The objective is to generate thermal gradients across the ribbon, perpendicular to the direction of glass flow. These thermal gradients change the localized viscosity of the glass in one area relative to another, impacting the attenuation of the glass, and thus local thickness, from a downward pull force. The air that discharges from these tubes circulates in a muffle door housing and is designed to dissipate out through venting holes 180° from where the air exits the bank of tubes near the front plate.

SUMMARY

It has been discovered by the present inventors that certain events may cause the venting holes to not fully perform their intended function, which may cause a pressure build-up in the muffle door housing that results in undesired gas flows leaking out of the muffle door housing. If undesired gas flows impinge upon the glass ribbon, they may adversely affect the thickness control by causing undesired thermal gradients in the glass. For example, the present inventors have discovered that the following events contribute to increased pressure in the muffle door housing that results in uncontrolled and/or undesired gas flows out of the muffle door housing: over time, as condensate builds up, the gas flowing through the venting holes can decrease—as orifice efficiency is highly dependent upon edge quality around the orifice hole; sometimes the amount of gas delivered by the bank of tubes—to effect the desired thermal gradients in the glass ribbon—increases beyond the dissipating-capacity of the venting holes; sometimes pressure changes in an enclosure surrounding a fusion draw machine (FDM) may affect the ability of gas to flow through the venting holes and out of the muffle door housing. When the uncontrolled and/or undesired gas-flows impinge on the glass ribbon, they cause undesired thickness variation in the ribbon.

The present disclosure sets forth ways to manage pressure within the muffle door relative to pressures in the FDM enclosure, and in an upper chamber disposed outside the FDM enclosure, so as to minimize or control undesired gas flows that would adversely affect thickness control.

According to one pressure-management technique, the pressure in the muffle door is managed so as to be less than the pressure at a location that is within the FDM enclosure as well as both outside and adjacent to the muffle door. For example, the location may be between the muffle door housing and the glass or glass ribbon. In the event of a crack or unintended opening in the muffle door housing, for example, this pressure difference reduces or prevents gas flow toward the ribbon and, thereby, undesired thickness variation.

There are various ways to carry out the first pressure management technique. For example, gas flow out of the muffle door housing may be managed by: increasing the size of the existing venting holes in the muffle door housing; increasing the number of venting holes by making new holes in the muffle door housing; connecting the muffle door housing to an air handler to either passively or actively remove gas from the muffle door housing; disconnecting one or more of the existing fluid-inlet tubes from its fluid source; and/or removing one or more of the existing fluid-inlet tubes. Alternatively, or in addition, the pressure in the FDM enclosure may be increased. These ways may be used individually, or in combination with one another.

According to a second pressure-management technique, the pressure in the muffle door is managed so as to be greater than the pressure in a chamber that is disposed around the outside of at least the portion of the FDM enclosure in which the muffle door is disposed. Accordingly, there is minimized an adverse affect on thickness due to any changes in pressure in the chamber that result in reduced gas flow from the muffle door housing.

Additional features and advantages will be set forth in the detailed description which follows, and in part will be readily apparent to those skilled in the art from the description or recognized by practicing the invention as exemplified in the written description and the appended drawings. It is to be understood that both the foregoing general description and the following detailed description are merely exemplary of the invention, and are intended to provide an overview or framework to understanding the nature and various principles of the invention as it is claimed.

By way of non-limiting example, the various ways to carry out the pressure-management techniques of the invention may be combined into various aspects as follows:

According to a first aspect there is provided a method of producing a glass sheet with reduced thickness variation, the method including: drawing a glass ribbon from a forming body that is disposed within an enclosure; delivering fluid to a housing, that is disposed within the enclosure and facing the forming body, so as to control local thickness of the ribbon, wherein delivering fluid to the housing comprises delivering fluid from a fluid source through a plurality of tubes having outlets within the housing; maintaining a first pressure at a location that is in the housing, and maintaining a second pressure at a second location that is in the enclosure as well as both outside and adjacent to the housing, so that the second pressure is greater than the first pressure; and separating a glass sheet from the ribbon.

According to a second aspect there is provided the method of aspect 1, wherein maintaining the second pressure greater than the first pressure comprises reducing the first pressure by managing a flow of fluid out of the housing.

According to a third aspect there is provided the method of aspect 2, wherein managing the flow of fluid out of the housing comprises disconnecting one or more of the plurality of tubes from the fluid source so that fluid may flow out of the housing through the disconnected one or more of the plurality of tubes.

According to a fourth aspect there is provided the method of aspect 3, further comprising coupling the disconnected one or more of the plurality of tubes to a vacuum, pump, blower, fan, or compressor.

According to a fifth aspect there is provided the method of aspect 2, wherein managing the flow of fluid out of the housing comprises removing one or more of the plurality of tubes from the housing so that fluid may flow out of the housing through a hole vacated by the one or more of the plurality of tubes.

According to a sixth aspect there is provided the method of aspect 2, wherein managing the flow of fluid out of the housing comprises actively removing fluid from the housing by a device that is a vacuum, pump, blower, fan or compressor.

According to a seventh aspect there is provided the method of any one of aspects 4 or 6, wherein a chamber is disposed around a portion of the enclosure in which is disposed the housing, and the fluid removed from the housing is outlet to the chamber.

According to an eighth aspect there is provided the method of aspect 6, wherein a chamber is disposed around a portion of the enclosure in which is disposed the housing, and wherein fluid removed from the housing is outlet to a space outside the chamber.

According to a ninth aspect there is provided the method of aspect 2, wherein a chamber is disposed around a portion of the enclosure in which is disposed the housing, and the method further includes: managing the flow of fluid out of the housing by passively coupling the housing with the chamber, and maintaining a third pressure in the chamber so that the third pressure is less than the first pressure.

According to a tenth aspect there is provided an apparatus, for making glass, including: a forming body having an end from which the glass is drawn; a housing having a front wall, the front wall facing the end of the forming body, a first pressure existing at a location that is in the housing and adjacent to the front wall; a tube including an outlet disposed within the housing; a fluid source coupled to the tube so as to deliver fluid through the outlet to control the temperature of the front wall; and an enclosure surrounding the forming body and the housing, a second pressure existing at a second location that is in the enclosure as well as both outside and adjacent to the housing, wherein the second pressure is greater than the first pressure.

According to an eleventh aspect there is provided the apparatus of aspect 10, further including: a chamber disposed around a portion of the enclosure in which is disposed the housing, a third pressure existing in the chamber; and a second tube coupled for fluid communication between the housing and the chamber.

According to a twelfth aspect there is provided the apparatus of aspect 11, further comprising one of a vacuum, pump, blower, fan, or compressor, disposed in fluid communication with the second tube so as to be capable of moving fluid from the housing to the chamber.

According to a thirteenth aspect there is provided the apparatus of aspect 10, further including: a chamber disposed around a portion of the enclosure in which is disposed the housing, a third pressure existing in the chamber; and a second tube coupled for fluid communication between the housing and a space outside the chamber.

According to a fourteenth aspect there is provided the apparatus of any one of aspects 11 or 13, wherein the first pressure is greater than the third pressure.

According to a fifteenth aspect there is provided the apparatus of aspect 13, further comprising one of a vacuum, pump, blower, fan, or compressor, disposed in fluid communication with the second tube so as to be capable of moving fluid from the housing to the space outside the chamber.

According to a sixteenth aspect there is provided the apparatus of aspect 10, further comprising one of a vacuum, pump, blower, fan, or compressor, disposed in fluid communication with the housing so as to be capable of removing fluid from the housing.

According to a seventeenth aspect there is provided the apparatus of any one of aspects 10 or 16, further comprising a chamber disposed around a portion of the enclosure in which is disposed the housing, a third pressure existing in the chamber, wherein the first pressure is greater than the third pressure.

The accompanying drawings are included to provide a further understanding of various principles of the invention, and are incorporated in and constitute a part of this specification. The drawings illustrate one or more embodiment(s), and together with the description serve to explain, by way of example, various principles and operation of the invention. It is to be understood that the various principles and features of the invention disclosed in this specification and in the drawings can be used in any and all combinations.

DETAILED DESCRIPTION

Figure 1:
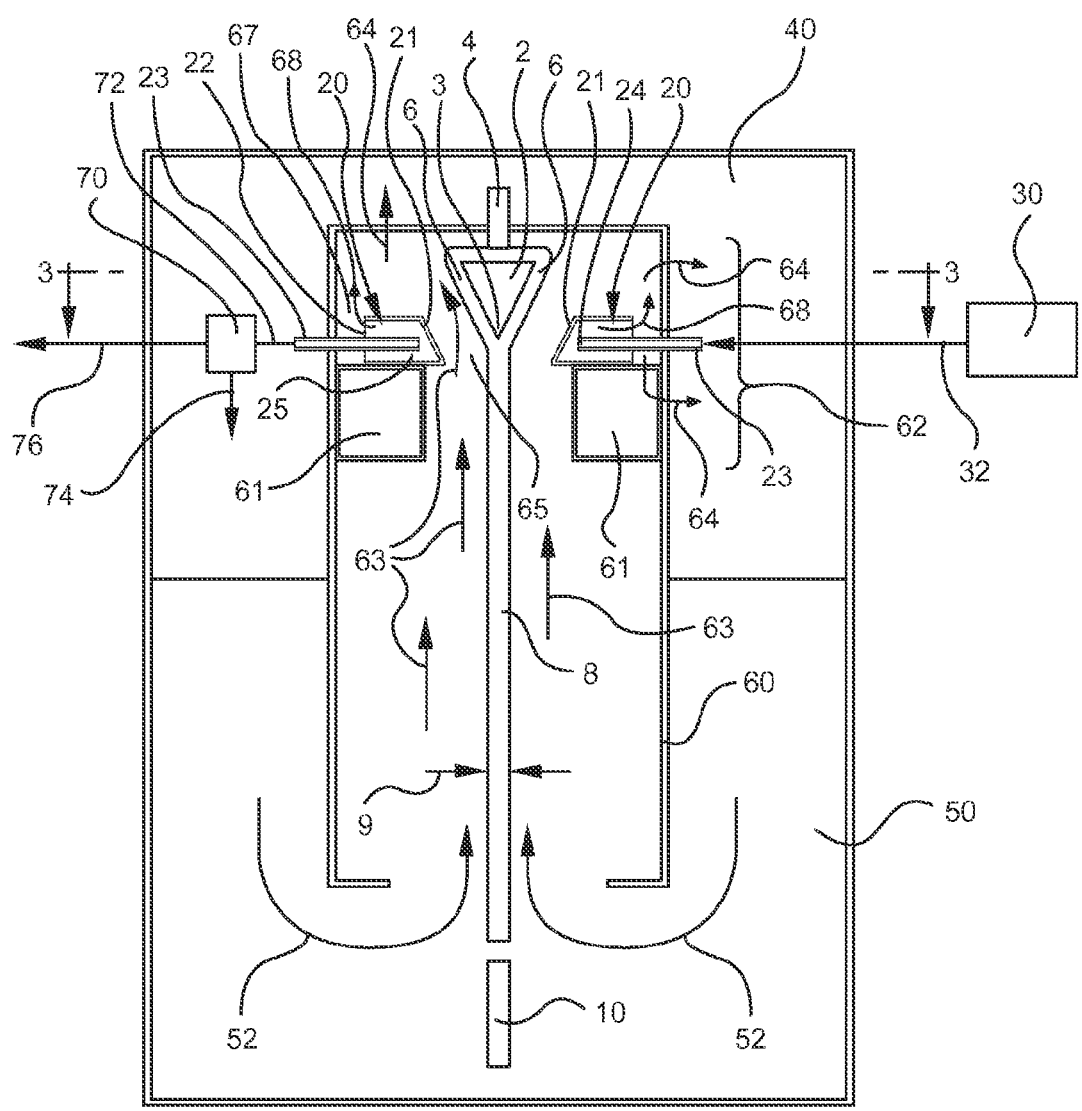
FIG. 1 is a schematic illustration of a thickness-control-zone (e.g. muffle door) housing disposed within a fusion-draw-machine housing that, in turn, is disposed within upper and lower chambers.

In the following detailed description, for purposes of explanation and not limitation, example embodiments disclosing specific details are set forth to provide a thorough understanding of various principles of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of various principles of the present invention. Finally, wherever applicable, like reference numerals refer to like elements.

As used herein, the singular forms "a," "an" and "the" include plural referents unless the context clearly dictates otherwise. Thus, for example, reference to a "component" includes aspects having two or more such components, unless the context clearly indicates otherwise.

Directional terms as used herein—for example up, down, right, left, front, forward, back, backward—are made only with reference to the figures as drawn and are not intended to imply absolute orientation.

The present disclosure sets forth ways to manage pressure within the muffle door relative to pressures in the FDM enclosure and upper chamber so as to minimize or control undesired airflows that would adversely affect thickness control of the glass ribbon. According to one pressure-management technique, the pressure in the muffle door is managed so as to be less than the pressure at a location that is within the FDM enclosure as well as both outside and adjacent to the muffle door housing. In the event of a leak, as by a crack or unintended opening in the muffle door housing, for example, this pressure difference reduces or prevents gas flow toward the ribbon and, thereby, undesired thickness variation. According to a second pressure-management technique, the pressure in the muffle door is managed so as to be greater than the pressure in a chamber that is disposed around the outside of the portion of the FDM enclosure in which the muffle door housing is disposed. Accordingly, there is minimized an adverse affect on thickness due to any changes in pressure in the chamber that reduce gas flow from the muffle door housing.

FIG. 1 is a schematic view of a fusion down-draw machine (FDM) for making glass. For purposes of explanation, various principles of the present invention will be set forth in the context of an FDM. However, it should be noted that the various principles of the present invention may be applied to other types of glass making machines and processes, for example, other down-draw processes and apparatuses, slot-draw, float, and/or up-draw.

As shown in FIG. 1, the FDM includes a forming body 2 and muffle door housings 20 disposed within an FDM enclosure 60. Various other equipment 61 may also be disposed within the enclosure 60 below the housing 20. The enclosure 60 is surrounded by an upper chamber 40 and a lower chamber 50.

The forming body 2 receives molten glass from an inlet pipe 4. The glass flows over the forming body 2 in two separate flows 6 that recombine at the end 3 of the forming body 2 to form a glass ribbon 8 having a thickness 9. Although not shown, for purposes of simplification, various structures are used to move and/or guide the glass ribbon 8 in a downward direction. A glass sheet 10 is then separated from the lower end of the ribbon 8 using techniques known in the art.

A pair of muffle door housings 20 is used to control variations in thickness 9 across the glass ribbon 8, i.e., in a direction into and out of the plane of FIG. 1. One housing 20 is disposed on each side of the ribbon 8. The housings 20 have the same structure and, therefore, only one will be described in detail. Similarly, various principles may be explained in connection with one of the shown housings 20, with the understanding that those same principles may apply equally to the other housing 20. The housing 20 is disposed so as to face the forming body 2, and the glass ribbon 8 when the glass ribbon 8 has a viscosity above its softening point. The housing 20 includes a front plate 21, a back plate 22, and a plurality of tubes 23.

The front plate 21 is formed of a material having high conductivity, low thermal expansion, and a high emissivity constant with time and temperature. Preferably the front plate 21 is formed of a silicon carbide slab and the back surface thereof, except for the bounding borders, is free from contact with any supporting structure which would cause thermal discontinuity across the face of the slab. The back plate 22, shown in more detail in FIG. 2, includes holes 28 through which the tubes 23 extend. The holes 28 may have a diameter substantially the same as, or slightly larger than, that of the tubes 23. Each of the tubes 23 includes an outlet 24 within the housing 20.

A fluid source 30 is coupled to the tubes 23 by conduit 32. The fluid may be air, compressed air, any other suitable gas, for example. Throughout the specification, the term "air" or "airflow" is used for convenience but is meant to include all suitable types of gas or other fluid. The fluid is delivered from the fluid source 30, through the conduit 32, through the tubes 23, and into the interior of the housing 20 so as to impinge on and locally control the temperature of the front plate 21. The flow of fluid through each tube 23 may be individually regulated, in a manner known in the art, to control the thickness gradient across the ribbon 8. The system is designed so that the fluid then flows out of venting holes 26 and/or other openings in the back plate 22 (for example openings created by a differential in size between the tubes 23 and the holes 28) to a location 67 in the enclosure 60, as indicated by arrow 68.

The FDM enclosure 60 is disposed around the forming body 2, housings 20, and equipment 61—for example coil windings, thermocouples, resistance heaters and/or insulating baskets—in order to provide a controlled environment (in terms of pressure, airflow, and/or temperature for example) to the glass making process. However, over the general section 62, there are various openings in the enclosure 60 which provide fluid flow paths 64 between the enclosure 60 and the upper chamber 40. These openings may include intended openings—for electrical connection, for fluid connection, for entry and/or access to the equipment 61 or other equipment, for water cooling ports, for resistance heaters, for coil windings for thermo couples, and/or for tubes 23, for example—and/or unintended cracks or holes. Even when seals are provided for the devices inserted through the intended openings, there may still be leaks in the seal allowing flow along paths 64.

Also, the environment in enclosure 60 is influenced by conditions in lower chamber 50. That is, for example, a relative differential in pressure and/or temperature between lower chamber 50 and enclosure 60 creates convective air flows along paths, exemplified by arrow 52, from the lower chamber to the enclosure 60. Additionally, due to the temperature differential within the enclosure 60 itself, convective currents cause air flows, exemplified by arrows 63, upward within the enclosure 60. Together the air flow movement along paths 52 and 63, contribute to a pressure within the enclosure 60 at location 65. The location 65 is within the enclosure 60, but is both outside and adjacent to housing 20. The heating, ventilation, and air conditioning system (HVAC) for chamber 50 may be used to influence the flow along path 52 and, thus, the pressure at location 65. That is, the HVAC system can either tend to increase pressure on chamber 50 which would increase flow along path 52 and thus tend to increase pressure at location 65, or tend to decrease pressure on chamber 50 which would tend to decrease flow along path 52 and thus tend to decrease the pressure at location 65.

A pressure exists at location 25 in housing 20. The pressure in housing 20 may increase during normal operation of the FDM. For example, if greater temperature change is required to control thickness in the ribbon 8, then more fluid may flow into housing 20 via tubes 23. Alternatively, or in addition, the fluid flow out of the housing 20 through the vent holes 26 and/or openings in rear plate 22 may be reduced and/or blocked due to condensate build-up at those locations. Accordingly, if the designed out-flow is not maintained, pressure may build up in housing 20.

The pressure at location 25 also may increase due to events in the upper chamber 40. For example, the pressure in upper chamber 40 may increase due to: a malfunction in a fan or control sensor; a dramatic change in pressure outside of the upper and lower chambers, e.g., in plant air; a change in pressure, or pressure reversal, between the area near inlet 4 and the down comer (not shown) that is coupled to the inlet 4; a sealing change or air exfiltration from an encapsulated melt system that is disposed in the upper chamber. And the increase in pressure in upper chamber 40 may lead to decreased flow along paths 64, and/or decreased flow along paths 68, thereby increasing the pressure in the housing 20 at location 25.

If the pressure at location 25 increases, as per the above description or by other factors, beyond the pressure at location 65, there may occur undesired fluid flow out of housing 20 and towards the ribbon 8. That is, a greater pressure at location 25 than at location 65 would drive fluid out of any cracks or openings in the housing 20. And this undesired fluid flow toward the ribbon 8 can disadvantageously cause unwanted cooling, which leads to uncontrolled thickness variation in the ribbon 8.

Accordingly, it is desired to maintain the pressure at location 25 less than the pressure at location 65 so as to prevent any air flowing from housing 20 toward the ribbon 8. That is, when any cracks or openings are present in housing 20 (especially in the portions of housing 20 that are adjacent to ribbon 8), the higher pressure at location 65 in the enclosure 60 will prevent air flowing into that region and toward the ribbon 8 from the lower pressure region at location 25. Pressure sensors, not shown but known to one of ordinary skill in the art, may be used to monitor the pressures at locations 25 and 65. These pressures may be easily compared, and then may be adjusted as necessary to maintain the desired condition of having the pressure at 25 lower than the pressure at 65. The pressure at 25 may be maintained lower than the pressure at 65 in various ways. For example, the pressure at 65 may be increased by forcing more flow along the paths 52, 63 as noted above, for example, or the pressure at 25 may be reduced by managing the flow of fluid out of housing 20. The fluid flow out of housing 20 may be managed in various different ways.

One way to manage fluid flow out of housing 20 is to make extra holes 27 in the back plate 22 of the housing. See FIG. 2. The number and size of the holes 27 can be used as a variable for adjusting the amount of air flow between the housing 20 and the enclosure 60 at location 67, which is away from the ribbon 8. The extra holes 27 may be formed as necessary throughout the duration of a glass-making operation. That is, for example, upon detection of an undesired pressure differential between the housing 20 and the enclosure 60 at location 65, one or more additional holes 27 may be formed in the back plate 22. Then, at a later time, when another undesired pressure differential between the housing 20 and the enclosure 60 at location 65 is detected, further additional holes 27 may be formed in the back plate 22. Moreover, although the additional holes 27 are shown as being uniformly spaced over the back of the plate 22, and of the same size, they need not be. That is, any suitable distribution and combination of sizes may be used for the additional holes 27. Additionally, although the holes 27 are shown as circular, they may be any suitable shape.

Figure 2:
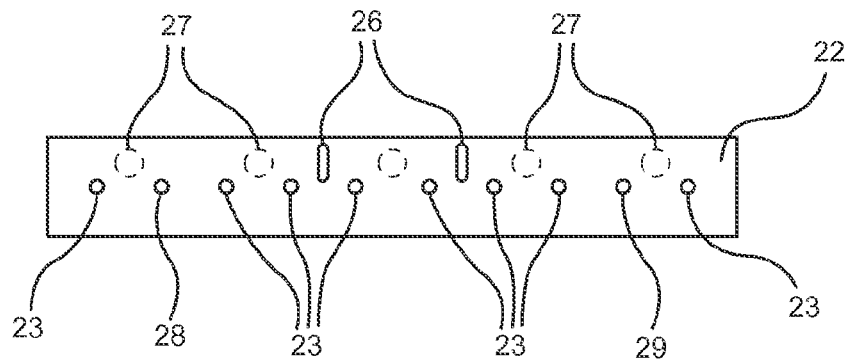
FIG. 2 is a schematic illustration of a back plate of a muffle door housing.
Figure 3:
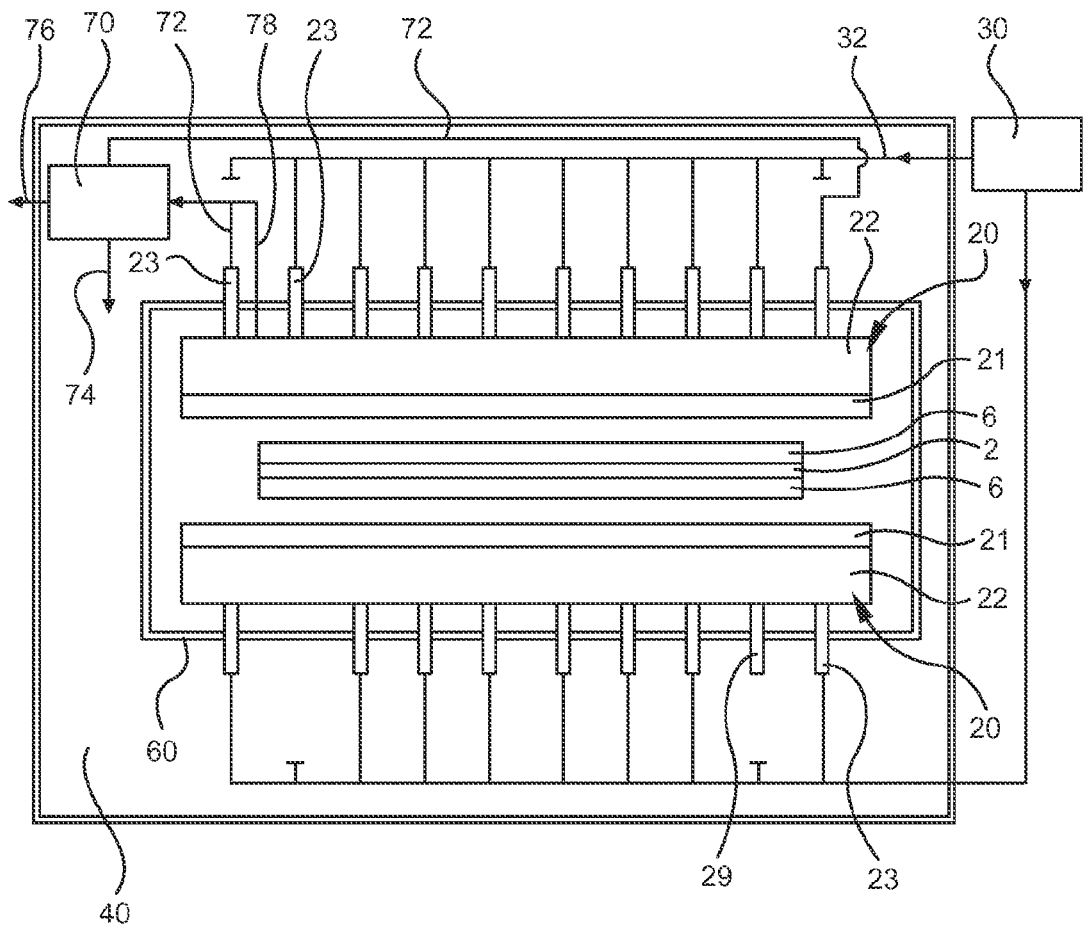
FIG. 3 is a schematic illustration of the apparatus of FIG. 1 as taken along line 3-3.

A second way to manage fluid flow from housing is to disconnect the conduit 32 (and thus fluid source 30) from one or more tubes 23, thus creating one or more disconnected tubes 29. See FIGS. 2 and 3. Leaving a disconnected tube 29 in place, but uncoupling the conduit 32 at a location outside of the enclosure 60 will provide a fluid flow path from housing 20 to the upper chamber 40. Although only one disconnected tube 29 is shown, any suitable number of disconnected tubes 29 may be used. Further, the location of the disconnected tube 29 may be varied as necessary. That is, a disconnected tube 29 may be used at any desired location across the width of the ribbon 8, i.e., in the right-and-left direction as shown in FIGS. 2 and 3. In one embodiment, it is desirable to use a disconnected tube 29 near the outer edges of the ribbon 8 to minimize any disturbance near the quality area of the ribbon 8. This technique offers the advantages of being easy to implement, and capable of being retro-fit to existing FDMs—even during continued operation of the FDM.

A third way to manage fluid flow from housing 20 is to remove one or more of the tubes 23 altogether, thereby providing one or more holes 28 in rear plate 22. See FIGS. 2 and 3. The one or more holes 28 then allow fluid communication from the housing 20 to the location 67 in the enclosure 60; this flow may then find its way into upper chamber 40 along any paths 64 that are present. Although only one hole 28 is shown, any suitable number of holes 28 may be used. Further, the location of the holes 28 may be varied as necessary. That is, a hole 28 may be used at any desired location across the width of the ribbon 8. In one embodiment, it is desirable to use a hole 28 near the outer edges of the ribbon 8 to minimize any disturbance near the quality area of the ribbon 8. This technique offers the advantages of being easy to implement, and capable of being retro-fit to existing FDMs—even during continued operation of the FDM.

A fourth way to manage fluid flow from housing 20 is to increase the size and/or number of the existing venting holes 26. Because it may be difficult to access the venting holes 26 from outside the FDM enclosure 60 during operation of the FDM, this technique may have limited applicability, but may be desired in some situations.

A fifth way to manage fluid flow from housing 20 is to provide an air handler 70 coupled to the housing 20. The air handler 70 may be coupled to the housing 20 by one or more tubes 23, and/or by a conduit 78. See FIGS. 1 and 3. The air handler 70 may include a path 74 so as to provide fluid communication between housing 20 and upper chamber 40. Alternatively, or in addition, the air handler may include a path 76 so as to provide fluid communication between housing 20 and a space outside of upper chamber 40. The air handler 70 may be a passive duct, a vacuum, a pump, a compressor, a fan, or a blower, for example. The volume and/or mass flow through the air handler 70 may be monitored in any manner known in the art. Although the air handler 70 is shown as being coupled to tubes 23 at the ends of a housing 20, it may be coupled to any desired number of tubes 23 at any desired locations. In one embodiment, it is advantageous to use the tubes 23 near the outer edges of the ribbon 8 to minimize any disturbance near the quality area of the ribbon 8.

When there is ready, passive, fluid communication between the housing 20 and the upper chamber 40, it is advantageous also to have the pressure in housing 20 be greater than the pressure in the upper chamber 40. In this manner, there may be minimized or reduced the effect on the pressure in housing 20 from disturbances in pressure in the upper chamber 40. There may be ready, passive, fluid communication between housing 20 and upper chamber 40 when, for example: the air handler 70 is a conduit, and the path 74 is present; the disconnected tube 29 is used; and/or to a lesser extent, when a tube 23 is removed altogether and the hole in enclosure 60 through which it used to extend is not sealed (or is insufficiently sealed).

As noted above, when there is a ready, passive, fluid communication between housing 20 and upper chamber 40, it is desirable to have the pressure in housing 20 greater than that in upper chamber 40. On another hand, there may be situations when it is acceptable to have the pressure in upper chamber 40 greater than that in housing 20. For example, when the air handler 70 is an active element—for example a fan, blower, pump, vacuum, or compressor—fluid may be moved from housing 20 to upper chamber 40 even though the pressure in chamber 40 is greater than that in housing 20. However, even when air handler 70 is an active element, it may still be desirable to have the pressure in housing 20 greater than that in upper chamber 40 to minimize the effects on airflow along any fluid flow paths 64 that are present.

A sixth way to manage fluid flow from housing 20 is to manipulate the HVAC system for upper chamber 40 so as to influence the flow along path 64 and, thus, the pressure at location 25. That is, this HVAC system can either tend to increase pressure on chamber 40 which would decrease flow along path 64 and thus tend to increase pressure at location 25, or tend to decrease pressure on chamber 40 which would tend to increase flow along path 64 and thus tend to decrease the pressure at location 25.

Figure 4:
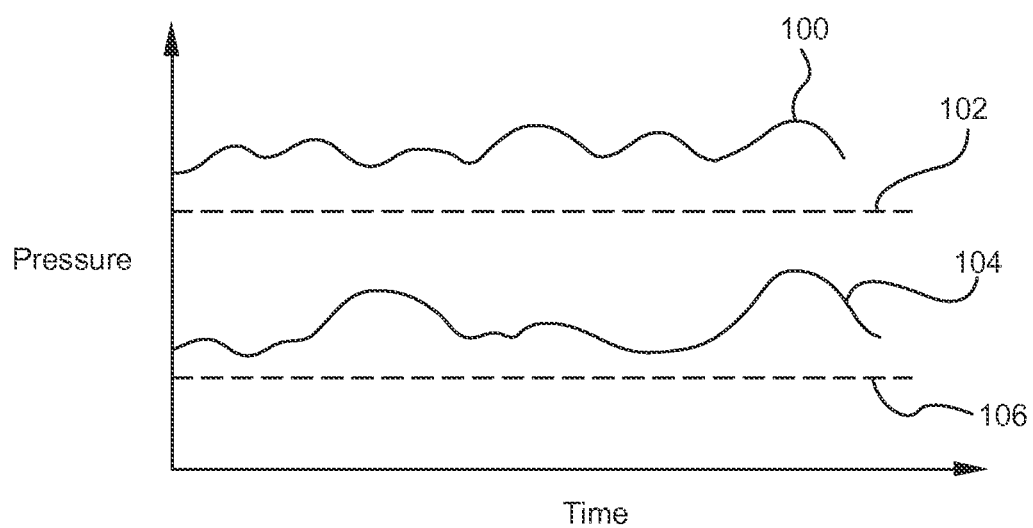
FIG. 4 is a graphical representation of pressures at different locations in the apparatus of FIG. 1.

FIG. 4 is a graphical representation of the pressures discussed above. Line 100 represents the pressure in the FDM enclosure 60 at location 65. The pressure 100 at location 65 slightly may vary over time due to variations in the conditions within the enclosure 60 and/or in the lower chamber 50. Line 104 represents the pressure in the upper chamber 40. The pressure 104 may instantaneously vary due to the factors as discussed above. Lines 102 and 106 represent different target pressures at location 25 in the muffle door housing 20. According to one embodiment, the target pressure 102 is below pressure 100, i.e., the pressure in housing 20 is below that in the enclosure 60 at location 65. According to another embodiment, target pressure 102 is above pressure 104, i.e., the pressure in the housing 20 is above the pressure in the upper chamber 40. According to still another embodiment, target pressure 106 is set below the pressure 104, i.e., the pressure in the housing 20 is set below that in upper chamber 40.

It should be emphasized that the above-described embodiments of the present invention, particularly any "preferred" embodiments, are merely possible examples of implementations, merely set forth for a clear understanding of the various principles of the invention. Many variations and modifications may be made to the above-described embodiments of the invention without departing substantially from the spirit and various principles of the invention. All such modifications and variations are intended to be included herein within the scope of this disclosure and the present invention and protected by the following claims.

What is claimed is:

1. A method of producing a glass sheet with reduced thickness variation, the method comprising:
   drawing a glass ribbon in a first direction from a forming body that is disposed within an enclosure;
   delivering fluid to a housing, that is disposed within the enclosure and facing the forming body, so as to control local thickness of the ribbon, wherein delivering fluid to the housing comprises delivering fluid from a fluid source through a plurality of tubes having outlets within the housing;
   maintaining a first pressure at a location that is in the housing, and maintaining a second pressure at a second location that is in the enclosure as well as both outside and adjacent to the housing, so that the second pressure is greater than the first pressure and contributes to a flow of fluid in a direction opposite to the first direction; and
   separating a glass sheet from the ribbon.

2. The method of claim 1, wherein maintaining the second pressure greater than the first pressure comprises reducing the first pressure by managing a flow of fluid out of the housing.

3. A method of producing a glass sheet with reduced thickness variation, the method comprising:
   drawing a glass ribbon from a forming body that is disposed within an enclosure;
   delivering fluid to a housing, that is disposed within the enclosure and facing the forming body, so as to control local thickness of the ribbon, wherein delivering fluid to the housing comprises delivering fluid from a fluid source through a plurality of tubes having outlets within the housing;
   maintaining a first pressure at a location that is in the housing, and maintaining a second pressure at a second location that is in the enclosure as well as both outside and adjacent to the housing, so that the second pressure is greater than the first pressure; and
   separating a glass sheet from the ribbon,
   wherein maintaining the second pressure greater than the first pressure comprises reducing the first pressure by managing a flow of fluid out of the housing, and
   wherein managing the flow of fluid out of the housing comprises disconnecting one or more of the plurality of tubes from the fluid source so that fluid may flow out of the housing through the disconnected one or more of the plurality of tubes.

4. The method of claim 3, further comprising coupling the disconnected one or more of the plurality of tubes to a vacuum, pump, blower, fan, or compressor.

5. The method of claim 4, wherein a chamber is disposed around a portion of the enclosure in which is disposed the housing, and the fluid removed from the housing is outlet to the chamber.

6. The method of claim 2, wherein managing the flow of fluid out of the housing comprises removing one or more of the plurality of tubes from the housing so that fluid may flow out of the housing through a hole vacated by the one or more of the plurality of tubes.

7. The method of claim 2, wherein managing the flow of fluid out of the housing comprises actively removing fluid from the housing by a device that is a vacuum, pump, blower, fan or compressor.

8. The method of claim 7, wherein a chamber is disposed around a portion of the enclosure in which is disposed the housing, and the fluid removed from the housing is outlet to the chamber.

9. The method of claim 7, wherein a chamber is disposed around a portion of the enclosure in which is disposed the housing, and wherein fluid removed from the housing is outlet to a space outside the chamber.

10. A method of producing a glass sheet with reduced thickness variation, the method comprising:
    drawing a glass ribbon from a forming body that is disposed within an enclosure;
    delivering fluid to a housing, that is disposed within the enclosure and facing the forming body, so as to control local thickness of the ribbon, wherein delivering fluid to the housing comprises delivering fluid from a fluid source through a plurality of tubes having outlets within the housing;
    maintaining a first pressure at a location that is in the housing, and maintaining a second pressure at a second location that is in the enclosure as well as both outside and adjacent to the housing, so that the second pressure is greater than the first pressure; and
    separating a glass sheet from the ribbon,
    wherein maintaining the second pressure greater than the first pressure comprises reducing the first pressure by managing a flow of fluid out of the housing, and
    wherein a chamber is disposed around a portion of the enclosure in which is disposed the housing, and the method further comprises:
    managing the flow of fluid out of the housing by passively coupling the housing with the chamber, and
    maintaining a third pressure in the chamber so that the third pressure is less than the first pressure.

* * * * *